(12) United States Patent
Tiwari

(10) Patent No.: US 9,900,545 B2
(45) Date of Patent: Feb. 20, 2018

(54) METHOD OF POWER SIGNAL DETECTION FOR SET TOP BOX DEVICES

(71) Applicant: Contec, LLC, Schenectady, NY (US)

(72) Inventor: Rajeev Tiwari, Sunnyvale, CA (US)

(73) Assignee: Contec, LLC, Schenectady, NY (US)

(*) Notice: Subject to any disclaimer, the term of this patent is extended or adjusted under 35 U.S.C. 154(b) by 0 days.

(21) Appl. No.: 15/170,775

(22) Filed: Jun. 1, 2016

(65) Prior Publication Data

US 2017/0353690 A1 Dec. 7, 2017

(51) Int. Cl.
H04N 17/00 (2006.01)
H04N 5/63 (2006.01)

(52) U.S. Cl.
CPC ............. *H04N 5/63* (2013.01); *H04N 17/004* (2013.01)

(58) Field of Classification Search
CPC ..................................................... H04N 17/00
USPC ....... 348/730, 558, 441, 449, 465, 473, 725, 348/554–555, 177, 180
See application file for complete search history.

(56) References Cited

U.S. PATENT DOCUMENTS

| | | | | |
|---|---|---|---|---|
| 4,222,068 A * | 9/1980 | Thompson | ........... | H04N 7/1713 348/E7.067 |
| 5,047,860 A * | 9/1991 | Rogalski | ................... | H04N 5/44 348/484 |
| 5,371,550 A * | 12/1994 | Shibutani | ........... | H04N 5/44513 348/570 |
| 5,524,281 A * | 6/1996 | Bradley | ................. | G01R 27/28 324/601 |
| 5,631,714 A * | 5/1997 | Saadoun | .............. | H03G 3/3015 348/736 |
| 5,748,259 A * | 5/1998 | Kang | ....................... | H04N 3/24 348/634 |
| 6,271,879 B1 * | 8/2001 | Overton | ................. | H04N 17/02 348/180 |
| 7,664,317 B1 | 2/2010 | Sowerby | | |
| 7,817,184 B1 * | 10/2010 | Michener | .............. | H04N 17/04 348/189 |
| 8,418,219 B1 * | 4/2013 | Parsons | ................ | H04N 17/004 348/180 |
| 8,782,727 B1 * | 7/2014 | Nagarajan | ........... | H04L 43/0888 725/115 |
| 2005/0179818 A1 * | 8/2005 | Wong | ................... | H04N 5/4401 348/558 |
| 2006/0044468 A1 * | 3/2006 | Chowdhury | ....... | H04N 5/44513 348/465 |
| 2011/0109809 A1 * | 5/2011 | Dai | .......................... | H04N 5/44 348/730 |
| 2016/0344457 A1 * | 11/2016 | Olsson | ................ | H04B 7/0413 |

OTHER PUBLICATIONS

Businesswire; Article entitled: "Genband and CTDI Settle Legal Dispute", located at <http://www.businesswire.com/news/home/20140321005528/en/GENBAND-CTDI-Settle-Legal-Dispute>, Mar. 21, 2014, 1 pg.

(Continued)

*Primary Examiner* — Paulos M Natnael
(74) *Attorney, Agent, or Firm* — Taylor English Duma LLP

(57) ABSTRACT

A method of power signal detection of set top boxes under test is disclosed. According to certain embodiments, detection of a failure mode of a set top box (STB) under test is based on video signal detection where the video signal is associated with multiple video output types and AC power outlet signal detection.

11 Claims, 1 Drawing Sheet

(56) References Cited

OTHER PUBLICATIONS

CED Magazine; Article entitled: "Cable Connects in Atlanta", located at <https://www.cedmagazine.com/article/2006/04/cable-connects-atlanta>, Apr. 30, 2006, 21 pgs.

Digital Producer; Article entitled: "S3 Group Unveils Exclusive Partnership in North America With First US StormTest(TM) Decision Line Customer", located at <http://www.digitalproducer.com/article/S3-Group-Unveils-Exclusive-Partnership-in-North-America-With-First-US-StormTest(TM)-Decision-Line-Customer--1668213>, Sep. 8, 2011, 3 pgs.

Electronic Design; Article entitled: "Testing of MPEG-2 Set-Top Boxes Must be Fast, Thorough", located at <http://www.electronicdesign.com/print/839>, published Nov. 18, 2001, 9 pgs.

Euromedia; Article entitled: "Automated TV Client testing: Swisscom partners with S3 Group to deliver the ultimate IPTV experience", located at <http://advanced-television.com/wp-content/uploads/2012/10/s3.pdf>, earliest known pub. date—May 30, 2013, 2 pgs.

Promptlink Communications; Article entitled: "Promptlink Communications Officially Launches Sep-Top Box Testing Platform", located at <https://www.promptlink.com/company/assets/media/2014-05-20.pdf>, published on May 20, 2014, 2 pgs.

S3 Group; Document entitled: "White Paper: The Importance of Automated Testing in Set-Top Box Integration", earliest known publication date Jun. 17, 2014, 11 pgs.

Teleplan; Article entitled: "Screening & Testing", located at <https://www.teleplan.com/innovative-services/screening-testing/>, earliest known publication date Mar. 21, 2015, 7 pgs.

Tvtechnology; Article entitled: "S3 Group's StormTest", located at <http://www.tvtechnology.com/expertise/0003/s3-groups-stormtest/256690>, published May 1, 2012, 2 pgs.

* cited by examiner

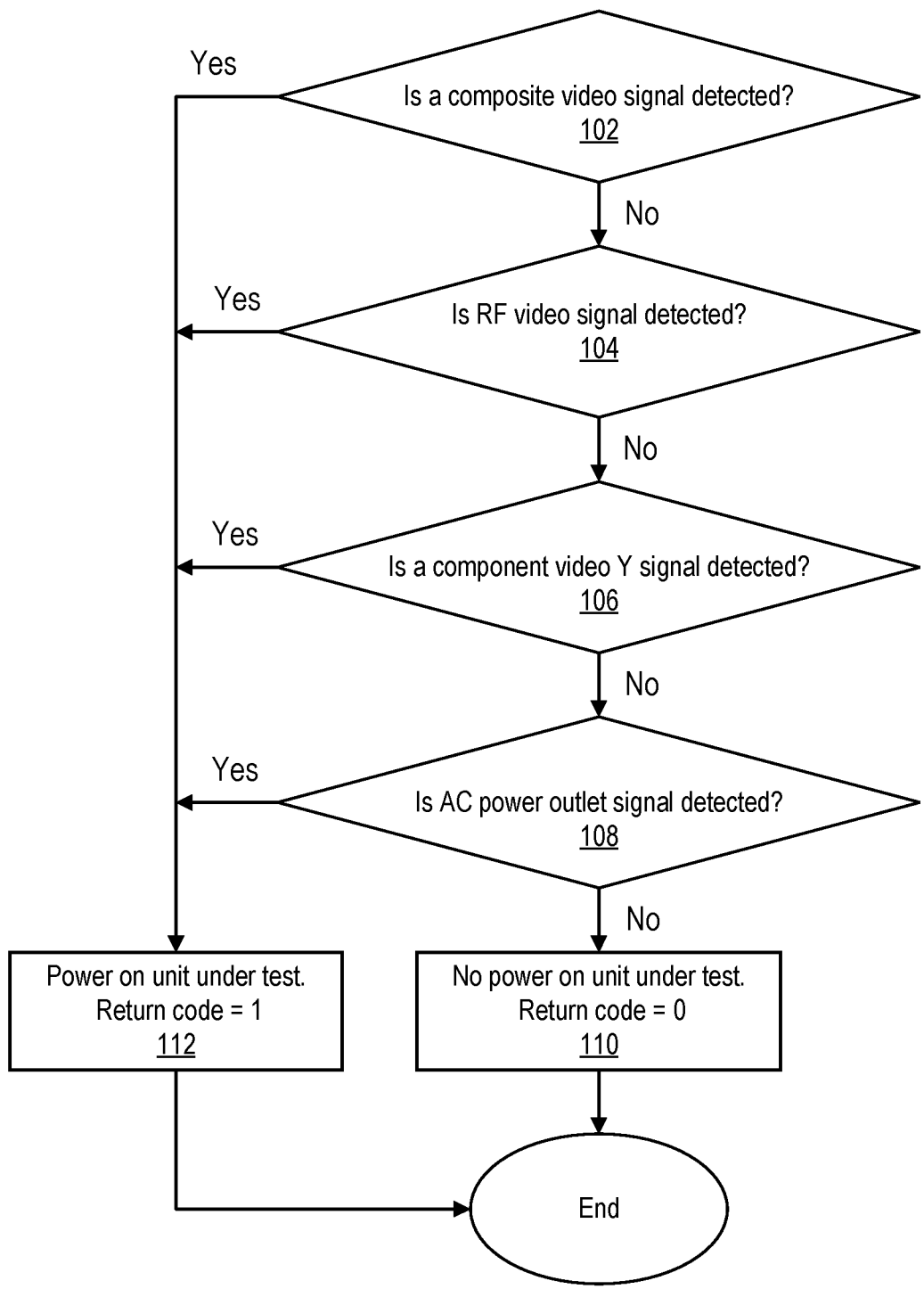

METHOD OF POWER SIGNAL DETECTION FOR SET TOP BOX DEVICES

TECHNICAL FIELD

The present invention is directed to a system for testing set top boxes.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 1 illustrates a high-level method of testing an STB unit under test after powering on the STB unit under test, according to certain embodiments.

DETAILED DESCRIPTION

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, detection of a failure mode of a set top box (STB) under test is based on video signal detection where the video signal is associated with multiple video output types and AC power outlet signal detection.

According to certain embodiments, when testing an STB unit for failure mode (e.g., no power-on or dead unit), the detection of the existence of video output signals and AC power outlet signal follow the following order on the STB unit under test: composite video signal, radio frequency (RF) video signal (on channel 3 and channel 4 for North American STB devices, and on other relevant channels for STB devices for other countries), component video Y signal, and AC power outlet signal.

FIG. 1 illustrates a high-level method of testing an STB unit under test after powering on the STB unit under test, according to certain embodiments. At block 102, it is determined if a composite video signal associated with the STB unit under test is detected. If a composite video signal associated with the STB unit under test is detected at block 102, then at block 112, the return code is set to 1 to indicate that the STB unit under test has power on.

If a composite video signal associated with the STB unit under test is not detected at block 102, then at block 104, it is determined if an RF video signal associated with the STB unit under test is detected.

If an RF video signal associated with the STB unit under test is detected at block 104, then at block 112, the return code is set to 1 to indicate that the STB unit under test has power on.

If an RF video signal associated with the STB unit under test is not detected at block 104, then at block 106, it is determined if a component video Y signal associated with the STB unit under test is detected.

If a component video Y signal associated with the STB unit under test is detected at block 106, then at block 112, the return code is set to 1 to indicate that the STB unit under test has power on.

If a component video Y signal associated with the STB unit under test is not detected at block 106, then at block 108, it is determined if an AC power outlet signal associated with the STB unit under test is detected.

If an AC power outlet signal associated with the STB unit under test is detected at block 108, then at block 112, the return code is set to 1 to indicate that the STB unit under test has power on.

If an AC power outlet signal associated with is not detected at block 108, then at block 110, the return code is set to 0 to indicate that the STB unit under test has no power.

According to certain embodiments, one or more composite video detection circuits or devices are used for detecting a composite video signals in the STB unit under test. Similarly, one or more RF video detection circuits or devices are used for detecting RF video signals in the STB unit under test. One or more component video Y detection circuits or devices are used for detecting component video Y signals in the STB unit under test. One or more AC power outlet detection circuits or devices are used for detecting AC power outlet signals in the STB unit under test.

According to certain embodiments, the test station is configured to test multiple STB units at the same time. Such a test station is flexible in that it can also test a single STB unit, if no other STB units are scheduled for testing.

In the foregoing specification, embodiments of the invention have been described with reference to numerous specific details that may vary from implementation to implementation. The specification and drawings are, accordingly, to be regarded in an illustrative rather than a restrictive sense.

I claim:

1. A method of detecting power signals of a set top box (STB) device under test of a plurality of STB devices, the method comprising:
    using a composite video detection circuit to determine whether a composite video signal associated with the STB device under test is detected;
    responsive to a lack of detection of any composite video signal by the composite video detection circuit, using an RF video detection circuit to determine whether an RF video signal associated with the STB device under test is detected;
    responsive to a lack of detection of any RF video signal by the RF video detection circuit, using a component video Y detection circuit to determine whether a component video Y signal associated with the STB device under test is detected;
    responsive to a lack of detection of any component video Y signal by the component video Y detection circuit, using an AC power outlet detection circuit to determine whether an AC power outlet signal associated with the STB device is detected; and responsive to a lack of detection of AC power outlet signal by the AC power outlet detection circuit, indicating the STB device under test has no power;

wherein, responsive to a detection of at least one of any composite video signal by the composite video detection circuit, any RF video signal by the RF video detection circuit, any component video Y signal by the component video Y detection circuit, and any AC power outlet signal by the AC power outlet detection circuit, indicating the STB device under test has power on.

2. The method of claim 1, wherein indicating that the STB device under test has power on subsequent to a detection of any composite video signal by the composite video detection circuit comprises setting a return code.

3. The method of claim 1, wherein indicating that the STB device under test has power on subsequent to a detection of any RF video signal by the RF video detection circuit comprises setting a return code.

4. The method of claim 1, wherein indicating that the STB device under test has power on subsequent to a detection of the AC power outlet signal by the AC power outlet detection circuit comprises setting a return code.

5. The method of claim 1, wherein indicating that the STB device under test has power on subsequent to a detection of any component video Y signal by the component video Y detection circuit comprises setting a return code.

6. The method of claim 1, further comprising applying power to the STB device under test before using a composite video detection circuit to detect determine whether a composite video signal associated with the STB device under test is detected.

7. An apparatus for detecting signals of a set top box (STB) device under test, the apparatus comprising:

a composite video detection circuit configured to determine whether a composite video signal associated with the STB device under test is detected;

an RF video detection circuit configured to determine whether an RF video signal associated with the STB device under test is detected;

a component video Y detection circuit configured to determine whether a component video Y signal associated with the STB device under test is detected; and an AC power outlet detection circuit configured to determine whether an AC power outlet signal associated with the STB device is detected;

wherein, responsive to a lack of detection of any composite video signal by the composite video detection circuit, any RF video signal by the RF video detection circuit, any component video Y signal by the component video Y detection circuit, and AC power outlet signal by the AC power outlet detection circuit, the apparatus is configured to indicate the STB device under test has no power;

wherein, responsive to a detection of at least one of any composite video signal by the composite video detection circuit, any RF video signal by the RF video detection circuit, any component video Y signal by the component video Y detection circuit, and AC power outlet signal by the AC power outlet detection circuit, the apparatus is configured to indicate the STB device under test has power on.

8. The apparatus of claim 7, further configured to set a return code after indicating that the STB device under test has power on.

9. The apparatus of claim 7, wherein the apparatus is configured to test a plurality of STB devices.

10. The apparatus of claim 7, further configured to perform the STB device under test with a predetermined order of signals.

11. The apparatus of claim 10, wherein the predetermined order of signals comprises, in sequence:

a composite video signal;

an RF video signal;

a component video Y signal; and an AC power outlet signal.

* * * * *